United States Patent [19]

Shotbolt

[11] 4,040,650
[45] Aug. 9, 1977

[54] ARTICULATE CONDUIT CONNECTOR

[75] Inventor: Keith Shotbolt, Gerrards Cross, England

[73] Assignee: Comex Marine Services, Inc., Houston, Tex.

[21] Appl. No.: 634,767

[22] Filed: Nov. 24, 1975

[30] Foreign Application Priority Data

Jan. 7, 1975 France ............................... 75.01191

[51] Int. Cl.² ............................................. F16L 27/06
[52] U.S. Cl. .......................................... 285/18; 285/93; 285/184; 285/261; 285/322; 285/DIG. 13
[58] Field of Search ................. 285/DIG. 13, 261, 38, 285/37, 322, 24, 18, 184

[56] References Cited

U.S. PATENT DOCUMENTS

| 994,230 | 6/1911 | Yancey | 285/38 X |
|---|---|---|---|
| 2,001,244 | 5/1935 | Ezell | 285/38 X |
| 2,535,599 | 12/1950 | Preston | 285/DIG. 13 |
| 3,251,611 | 5/1966 | Haeber et al. | 285/322 X |
| 3,754,780 | 8/1973 | Pogonowski | 285/DIG. 13 X |
| 3,874,706 | 4/1975 | Arnold | 285/24 |

FOREIGN PATENT DOCUMENTS

| 1,245,874 | 10/1960 | France | 285/DIG. 13 |
|---|---|---|---|
| 1,095,617 | 12/1954 | France | 285/DIG. 13 |
| 932,795 | 7/1963 | United Kingdom | 285/DIG. 13 |
| 910,572 | 11/1962 | United Kingdom | 285/DIG. 13 |
| 794,551 | 5/1958 | United Kingdom | 285/DIG. 13 |

Primary Examiner—Thomas F. Callaghan
Attorney, Agent, or Firm—Bill B. Berryhill

[57] ABSTRACT

Apparatus for joining two conduits in an articulated relationship comprising: a male member attached to one of the conduits and having a radially enlarged portion thereon; a female member attached to the other of said conduits and into which the male member may be inserted; a gripping assembly carried by the female member and movable from a radially expanded position, in which the male member may be freely inserted and removed from the female member, to a radially contracted position gripping the enlarged portion of the male member, preventing its removal and locking it in a fixed articulated relationship with the female member; and an actuating assembly, carried by the female member, engageable with the gripping assembly and being operable by a force applied externally of the apparatus for moving the gripping assembly between its expanded and contracted positions.

22 Claims, 6 Drawing Figures

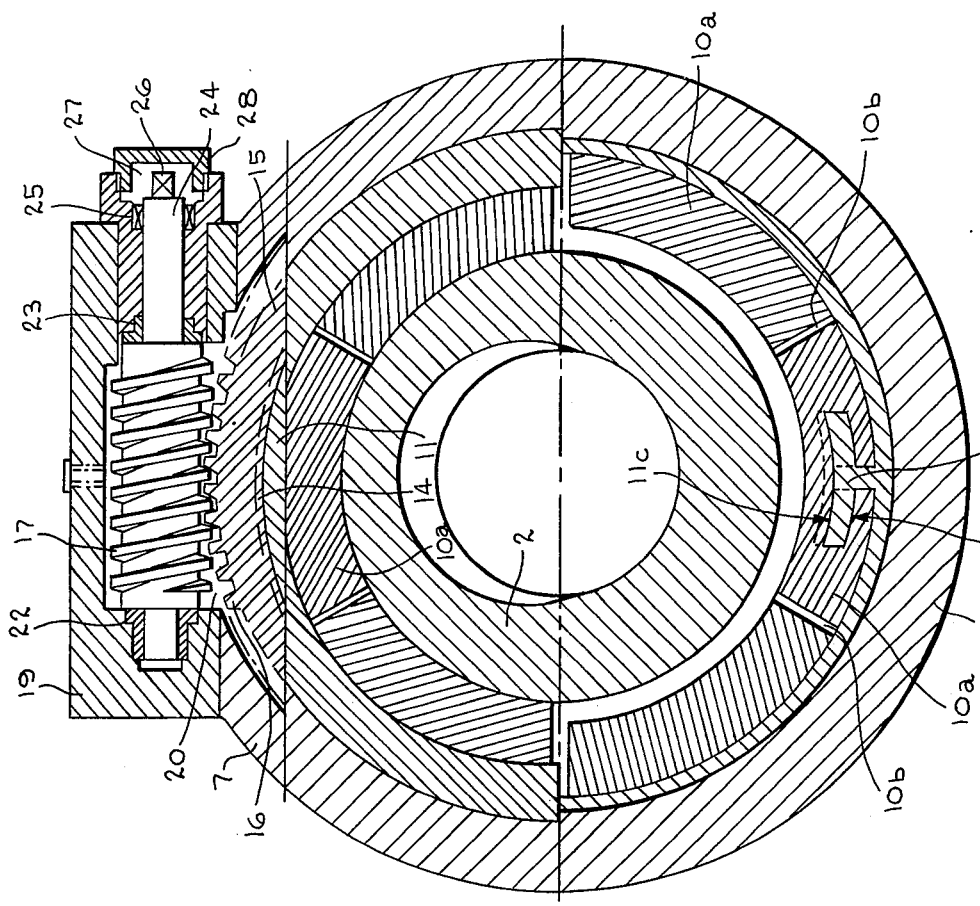
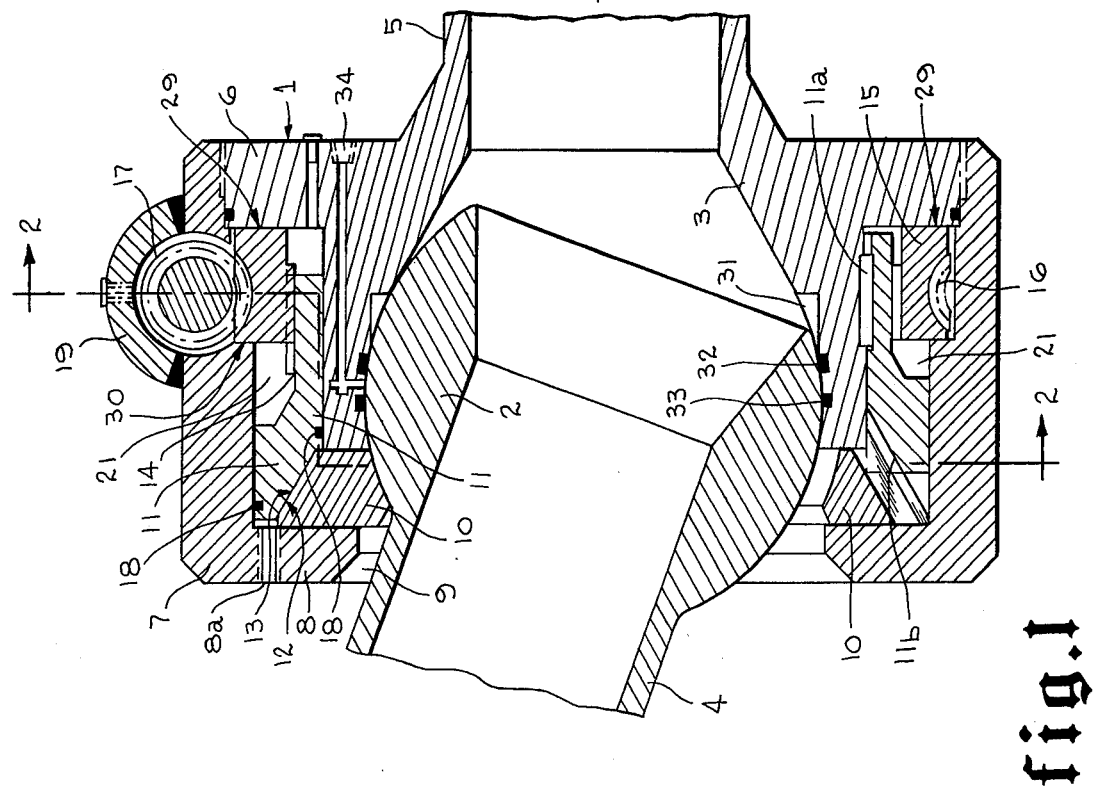

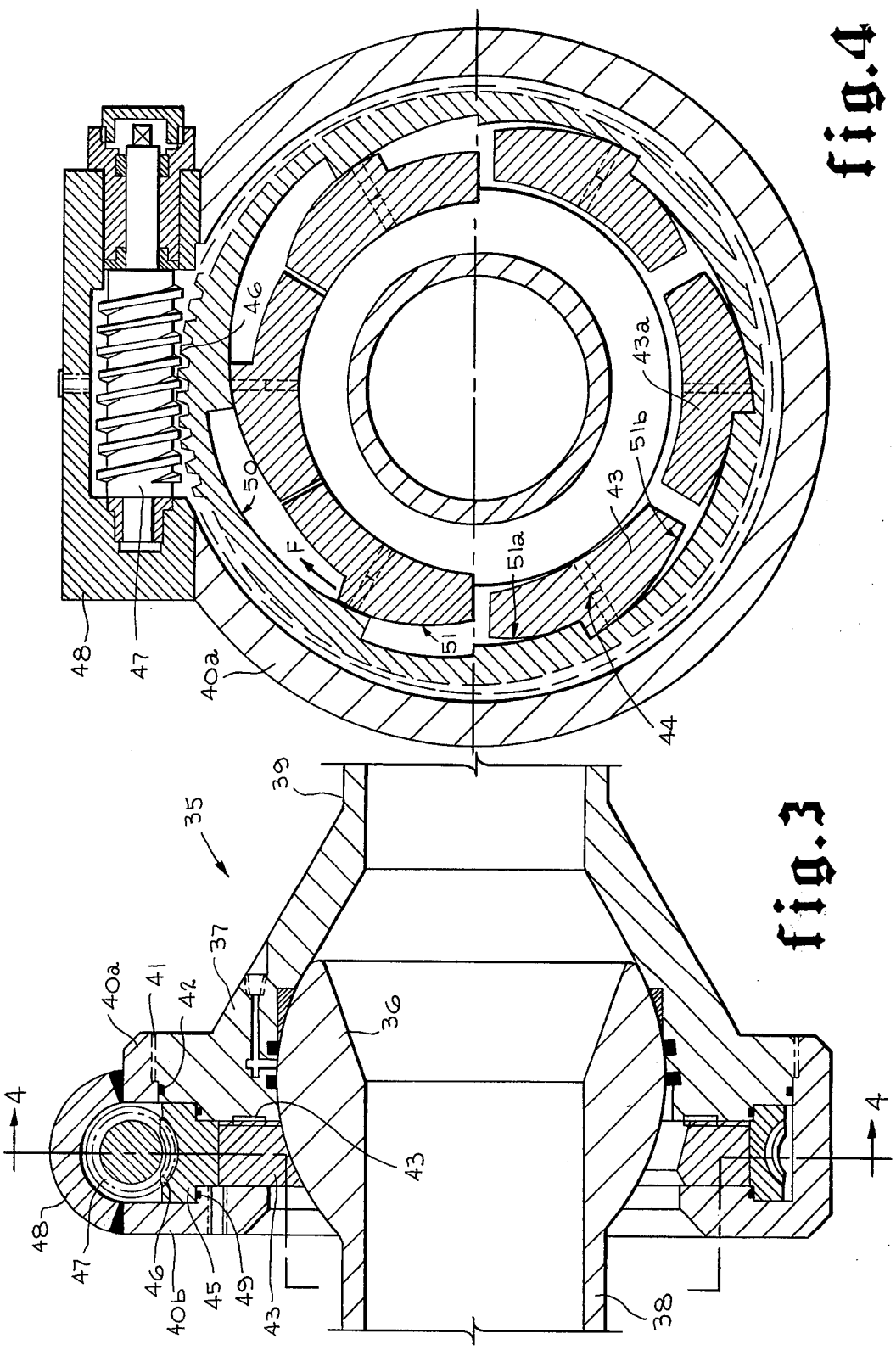

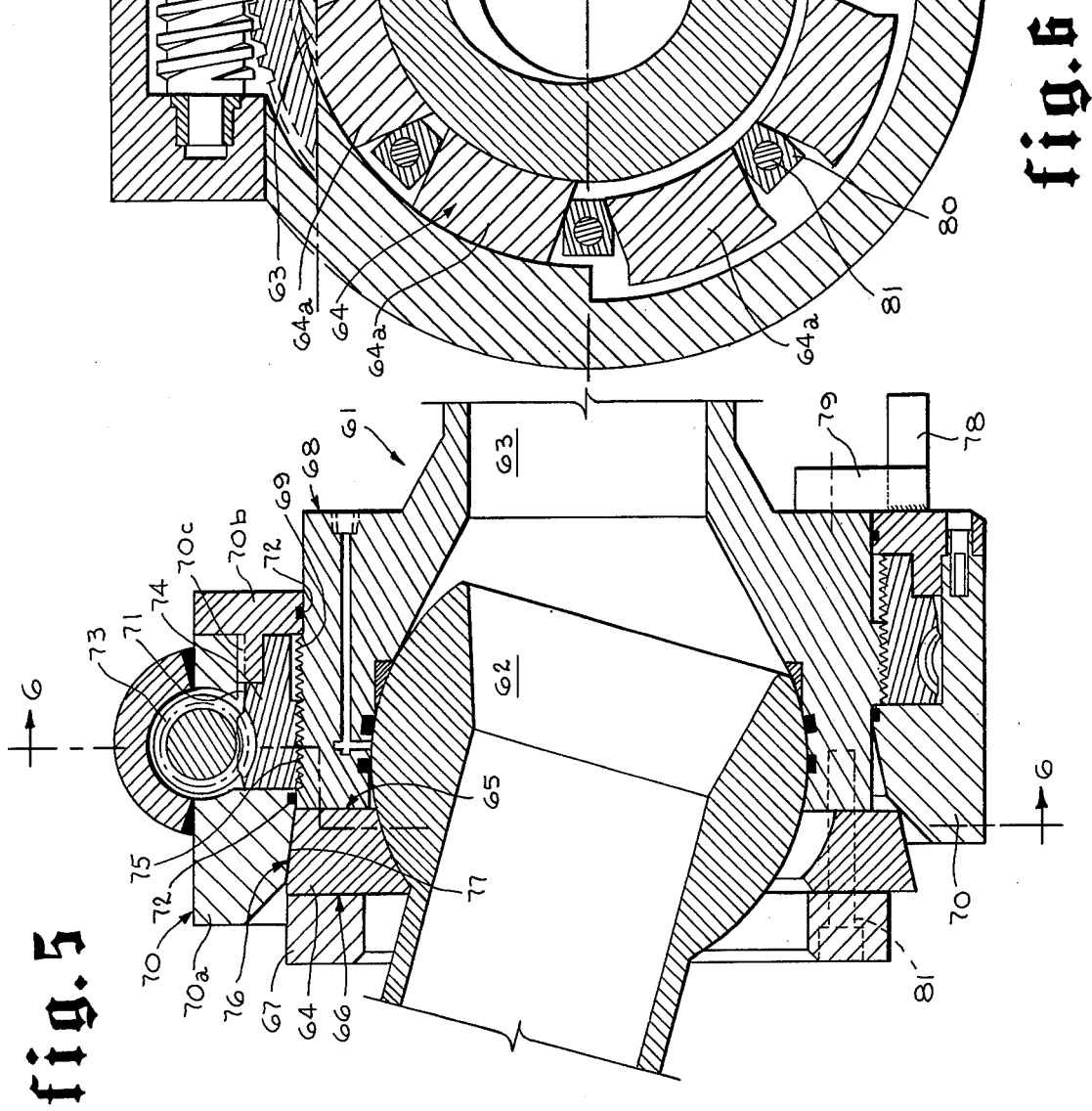

ARTICULATE CONDUIT CONNECTOR

BACKGROUND OF THE INVENTION

1. Field of the Invention

The present invention pertains to connector apparatus for joining elongated members, in particular conduits or pipes. More specifically, it pertains to connector apparatus suitable for connecting non-axially aligned pipes and conduits in particularly difficult environments, such as in submarine installations.

2. Description of the Prior Art

There are, of course, many connector devices for joining the ends of two conduits or for coupling a conduit to the outlet of an apparatus. One general type of connector utilizes a ball and socket joint, in which the male portion is attached to one conduit and the female to the other conduit. The male is received within the female portion and some means is provided for holding the two portions together.

Some connectors of the ball and socket joint type have been developed for submarine installation. Such connectors have been used for providing a flexible joint to connect a marine riser or conduit to a submarine wellhead, thus providing communication between the submarine wellhead and a marine drilling platform. In many of these connectors, the ball is latched into the female socket by a resilient collar which is radially deformable and maintained in a compressed state by an annular piston of a hydraulic jack or other similar devices. Such flexible connectors permit some degree of relative rotary and bending movement between the coupled conduits. For the submarine wellhead and riser type installations, this is desirable. Examples of such connectors may be seen in U.S. Pat. Nos. 3,333,870; 3,450,421; and 3,695,633.

The flexible connector designs for wellhead riser installations are not suitable for connecting pipes in a high pressure circulating fluid pipeline which may lie for prolonged periods on the sea floor. In such applications, where ball and socket type connectors have recently been used, the resilient collar is replaced by a locking system which grips the ball with sufficient force to prevent it from turning. In this way, the connected conduits become a fixed unit with good mechanical continuity capable of withstanding the strong forces and stresses existing in pipelines.

Like the submarine wellhead-riser connectors of the prior art, the ball and joint connectors now being used for joining pipelines utilize some form of hydraulic jack or mechanism for locking. The locking system may comprise a plurality of jaws forming a gripping assembly which is activated by radial hydraulic jacks or an annular piston of a hydraulic jack. Such a pipeline connector may be seen in U.S. Pat. No. 3,874,706.

Since these ball and joint connectors of the prior art utilize hydraulic mechanisms, it is necessary to use a compressed fluid to maneuver the locking mechanism, meaning that such connectors are not autonomous. They are useful for installations situated near a platform which supports a central hydraulic system to feed the hydraulic mechanism, but they are poorly adapted for fitting in a pipeline which may stretch for some length along the sea floor and where they may be inaccessible to a central hydraulic system.

In order to overcome the limitations represented by the necessity of permanently feeding hydraulic mechanisms after the locking system has fixed onto the ball, the compressed fluid is sometimes replaced by a polymerizable resin which hardens within the connector and keeps it fixed in the locked position. However, such a method of fixing the locking system has the disadvantage of being irreversible, preventing uncoupling and replacement of malfunctioning components.

SUMMARY OF THE INVENTION

In the present invention, a ball and joint type connector is disclosed which has certain advantages over those of the prior art, making it more suitable for connecting conduits in a pipeline. Specifically, the connector of the present invention produces a tight connection between two pipes which are not perfectly aligned, fixing the pipes together in such a way that they become a solid unit, withstanding the large forces and stresses which may be placed thereon. The connector of the present invention is autonomous and reversible so that the pipes connected thereby can also be uncoupled with relative ease. Furthermore, the connector is so constructed that the force for operation thereof is relatively small and the connector is self-locking so that upon removal of the operational force, the connector will remain in its locked position.

These objectives are obtained by providing a male member for attachment to one conduit and a female member for attachment to the other and into which the male member may be inserted. A gripping assembly, which may include a plurality of segmented jaws, is carried by the female member for movement from a radially expanded position, in which the male member may be freely inserted and removed from the female member, to a radially contracted position in which the jaws grip the male member preventing its removal and locking it in a fixed articulated relationship with the female member. An actuating assembly is also carried by the female member and is engageable with the gripping assembly for operation by an externally applied force to move the gripping assembly between its expanded and contracted position.

The actuating assembly may comprise a rotatable worm wheel engageable with and driven by a worm which is mounted on a shaft to which the externally applied force may be applied. In one embodiment, the worm wheel is provided with internal cam surfaces which engage cooperating surfaces on the gripping assembly jaws, so that upon rotation of the worm wheel, the jaws are forced from the expanded position into their contracted locking engaging positions. In other embodiments, the worm wheel engages a cylindrical member which is mounted for axial movement in response to rotation of the worm wheel. The cylindrical member is provided with wedge surfaces which cooperate with corresponding surfaces on the gripping assembly jaws to force them from the expanded to the contracted positions.

The worm and worm wheel arrangement provides several important functions in the connector. It allows the connector to be reversible, i.e., it may be coupled and uncoupled with equal ease. It allows the connector to be operated with a substantial mechanical advantage. The inherent self-locking design of worm and worm wheels arrangements makes the connector autonomous, operable at almost any location and capable of being left in its locked position without having to maintain any applied force thereon.

The resulting connector is extremely useful in submarine connections. Divers simply have to place the male member in the female member, which is already equipped with the necessary gripping and locking assembly, and the actuate the connector by turning the worm. These operations are facilitated by the fact that the ball joint design makes it possible to connect two pipes which are out of alignment by as much as 20°. Many other objects and advantages of the invention will be apparent from reading the specification which follows in conjunction with the accompanying drawings.

BRIEF DESCRIPTION OF THE DRAWINGS

FIG. 1 is a longitudinal section of a connector according to a preferred embodiment of the invention, the upper half illustrating the connector in its contracted and locked position and the bottom half illustrating the connector in its expanded and unlocked position;

FIG. 2 is a cross sectional view of the embodiment of FIG. 1, taken along lines 2—2 thereof;

FIG. 3 is a longitudinal section of a connector according to another preferred embodiment of the invention, the upper half illustrating the connector in its contracted and locked position and the lower half illustrating it in its expanded and unlocked position;

FIG. 4 is a cross section of the embodiment of FIG. 3, taken along line 4—4 thereof;

FIG. 5 is a longitudinal section of a connector according to still another preferred embodiment of the invention, the upper half illustrating the connector in its contracted and locked position and the bottom half illustrating it in its expanded and unlocked position; and FIG. 6 is a cross section of the embodiment of FIG. 5, taken along line 6—6 thereof.

DESCRIPTION OF THE PREFERRED EMBODIMENTS

Referring first to FIGS. 1 and 2, a connector 1, according to a preferred embodiment of the invention, will be described. The connector 1 may comprise a male member 2, having a radially enlarged portion forming a ball, seated in a female or socket member 3. In the expanded or unlocked position, the male member 2 is freely insertable into and removable from the female member 3.

The male and female members 2 and 3 are fixed at the extremities of pipes 4 and 5, respectively, and permit such to be connected end to end to form a submerged pipeline section. Such a connector, by virtue of the presence of the ball, permits connection between two pipes whose axes form an angle of up to 20°.

The female member 3 may have formed integrally thereon a flange portion 6 which may be threaded on its periphery for threadedly receiving a complementary threaded ring 7. The threaded ring 7 may have an internally projecting flange 8 formed thereon so that the flanges 6 and 8 with the ring 7 form a cylindrical casing which envelopes the ball 2 within the socket 3. Aperture 8a may be used to pack adhering grease into the casing formed by ring 7 and flange 8 before the connector is immersed in water. The flange 8 defines an opening 9, the diameter of which is greater than that of ball 2, so that the ball may be inserted into and removed from the socket 3.

The connector also includes a gripping assembly 10 situated inside the casing defined by ring 7 and flanges 6 and 8. The gripping assembly may be formed, for example, by a plurality of jaws 10a in the form of circular segments separated by slots 10b in such a way that they can be shifted from a radially expanded position, as in the lower half of FIGS. 1 and 2, to a radially contracted position gripping the ball 2, as in the upper half of FIGS. 1 and 2.

The casing formed by flanges 6 and 8 and ring 7 define an annular space in which a portion of an actuating assembly sleeve 11 slides. The jaws of the gripping assembly 10 are provided with conical lateral faces 12 which engage a conical extremity 13 of the sleeve 11 and cooperate therewith to contract or tighten the gripping assembly. A pin 11a may be placed between the sleeve 11 and the outer periphery of socket 3 to prevent the sleeve 11 from rotating. Sleeve 11 includes a male thread 14 on which is screwed an internally threaded collar or gear member 15. At its internal and external peripheries, sleeve 11 includes sliding annular seals 18.

The exterior of gear member 15 is provided with teeth 16 which engage an endless screw 17. This is a worm gear arrangement and the gear member 15 may be referred to as the worm wheel and the endless screw 17 as the worm. The worm 17 and worm wheel 15 constitute a reducing gear which permits an operator to firmly fix the gripping assembly 10 without having to exert extreme forces in manipulating the worm 17.

A small cylindrical casing 19 may be provided around the worm 17 and a transverse aperture 20 of ring 7. This aperture provides access for the worm 17 and worm wheel 15.

Sleeve 11, together with the external surface of the socket 3, the internal surface of ring 7, flange 6 and the casing 19 define a closed space 21 which is isolated from the exterior of the apparatus and may be filled with a liquid for emergence of the worm 17 and worm wheel 15. This liquid protects the mechanical parts from corrosion and is preferably an oil which simultaneously serves as a lubricant.

As best seen in FIG. 2, the worm 17 is supported by bearings 22 and 23 and extended by a spindle shaft 24 which passes out one extremity of the casing 19 through a seal member 25. The extremity of the spindle shaft 24 is polygonal, for example a square, or other equivalent device, by means of which the worm can be turned with a mating handle or wrench (not shown). The polygonal end 26 is disposed in a recess 27 which may be isolated from the exterior by a cover or cap 28 so that it remains protected even after a prolonged stay underwater.

The worm wheel 15 is installed between a lateral surface 29 on one face of the flange 6 and the lateral surface 30 formed by a wall of aperture 20 in such a way that when worm 17 is turned, the worm wheel 15 is also caused to rotate, without being able to move longitudinally or axially. As a consequence, rotation of the worm wheel 15 causes sleeve 11 by virtue of its threaded connection therewith to move axially in one direction or the other. Thus, the worm 17 permits the connector to be locked or unlocked.

As the sleeve 11 is moved axially, to the left as shown in upper half of FIG. 1, the gripping assembly 10 grips the ball 2 with sufficient force that the ball cannot move relative to the gripping assembly. Thus, locking integrates the parts of the connector in the relative angular or articulated position which existed at the moment of actuating the gripping assembly.

The connector may also be provided with a seat 31 of a suitable material, such as bronze or other analogous metal, and a pair of annular seals 32 and 33. A test port 34 permits the testing of the seal.

To render the connector positive in unlocking, the sleeve 11 may be provided with T-shaped keys 11b for engagement with corresponding T-shaped grooves of the gripping assembly jaws 10a. These grooves are defined by faces 11c which are parallel to the conical terminal face 13 of sleeve 11 in such a way that when sleeve 11 moves toward the worm wheel 15, jaws 10a of the gripping assembly 10 will be expanded and unlocked.

Referring now to FIGS. 3 and 4, a connector 35 according to another embodiment of the invention will be described. As in the previous design, this connector includes a male end 36 consisting of a radially enlarged portion in the form of a ball and a female member 37 consisting of a spherical socket in which the male member is engaged. These members may be fixed by any suitable method such as welding to the extremities 38 and 39 of two pipes which are to be connected underwater.

A cylindrical casing 40 consisting of a ring 40a and an internally directed flange 40b may be fixed to the female socket 37. The ring 40a is preferably fixed in a sealed fashion, for example by means of thread 41 and an annular seal 42.

The gripping assembly 43 of this embodiment also includes a plurality of segmented jaws 43a disposed within the casing 40. The jaws 43a are held lateral surfaces formed by one face of flange 40b and one face of the socket 37 in such a way that they can slide radially but are prevented from axial movement. Cotter pins and mating grooves 44 may be provided in the jaws 43a and socket 37 to prevent the gripping assembly from turning or rotating around the axis of the connector socket 37.

The jaws 43a of the gripping assembly are provided with spherical internal surfaces by which, when applied against the surface of ball 2 behind the maximum width thereof so that the gripping assembly is in tightened or locked position, the ball is trapped within the casing. Since the gripping assembly 43 cannot pivot relative to socket 37 and since it cannot move axially, the connector assures total integration of the two ends and, because of its compact form, can withstand very large forces.

Like in the previous embodiment, the actuating assembly comprises a worm wheel 45 having teeth 46 thereon to cooperate with an endless screw or worm 47. As in the previous design, worm 47 is placed within a transverse casing 48 and contains elements which permit the worm to be turned by application of an externally applied force. Annular seal 49 permits the casing 48 to be sealed and filled with a liquid, for example oil, which lubricates the contact between the worm and worm wheel and protects these mechanical elements against the surrounding corrosive environment.

The tightening of the gripping assembly 43 is achieved by means of cams 50 having transverse profile, situated at the internal periphery of the worm wheel 45. The cams 50 cooperate with cams 51 situated at the outer surfaces of each of the jaws 43a of the gripping assembly. As illustrated in FIG. 4, the gripping assembly comprises six jaws 43a in the form of circular segments in which one half 51a of the outer surfaces of each jaw has a circular section, while the other half 51b has a cam profile of increased radius to cooperate with the cams 50 on the interior of worm wheel 45. Obviously, the number of jaws and cams in the profile of the cams could be different.

In the exemplary embodiment, it suffices to turn the worm wheel a maximum of one-sixth of one revolution in the direction of arrow F to tighten or lock the gripping assembly and in the opposite direction to unlock it. It is therefore sufficient for the tooth part 46 of worm wheel 45 to extend over an annular sector of only 60°.

Referring now to FIGS. 5 and 6, another preferred embodiment of the invention will be described. This connector offers the same advantages shown in FIGS. 1-4 with additional advantages. In the present embodiment, the gripping assembly is maintained integrally with the female socket by a support collar or sleeve which is subjected only to axial pressures. Thus, unlike other designs, the connector is not subjected to large pressures or forces which might rupture the connector housing.

In addition, the present connector embodiment is designed such that the sleeve which cooperates with the gripping assembly jaws is free on its external surface. This prevents the sleeve from becoming fixed in the locked position due to the radial reaction forces of the gripping assembly, as with other designs. The sleeve is free on its external surface and can easily be released.

The connector 61 comprises a male member 62 in the form of a ball and a female member 63 in the form of a socket for receiving the ball 62. As in the previous embodiments, the axes of the two members can form an angle of as much as 20° between them.

The connector has a locking or gripping assembly 64 consisting of a plurality of jaws 64a. The gripping assembly can slide from a radially expanded position to a radially contracted position to tighten the ball 62 and maintain it locked in socket 63. The jaws 64a slide between the terminal face 65 of socket 63 and the internal face 66 of a support ring or collar 67. The faces 65 and 66 are perpendicular to the axis of the female member.

The exterior of socket 63 is provided with a cylindrical surface 68 and a threaded section 69. The surface 68 is surrounded by a cylindrical sleeve 70 which can slide axially. Together with surface 68, the sleeve 70 defines an annular cavity 71, sealed by annular seals 72. This cavity contains a endless screw or worm 73, the axis of which is perpendicular to the plane of the drawing and a worm wheel 74 whose axis is coincidental with the axis of the female member 63. In other embodiments, the sealed space surrounding the worm the worm wheel in which anti-corrosion fluid may be placed varies in volume upon tightening and removing the connector. In the present embodiment, this volume is essentially constant, assuring complete immersion of the working parts and assuring that no seal rupture will be induced by displacement of the parts.

The worm wheel 74 is externally toothed and entrained in rotation by worm 73. The worm wheel is provided with an internal thread 75 which threadedly engages the threaded section 69 of the female member. The two lateral faces of worm wheel 74 are supported by contact with the lateral walls of cavity 71 in such a way that the rim cannot move axially relatively to sleeve 70. However, by virtue of the threaded engagement between the worm wheel threads 75 and female member threads 69, rotation of the worm wheel causes it and the sleeve 70 to move axially in one direction or the other.

Sleeve 70 is provided with a conical surface 76 which cooperates with conical lateral faces 77 of gripping jaws 64a to tighten the gripping assembly radially when sleeve 70 is displaced axially from right to left, as viewed in FIG. 5. As shown in the upper half of FIG. 1, the sleeve 70 occupies the extreme left when the connector is in its locked position. When unlocked, as in the lower half of FIG. 1, the sleeve is returned to the right.

A shaft 78 formed integrally of sleeve 70 slides between two branches of a fork 79 which is integral with the female socket 63, to prevent sleeve 70 from turning. Sleeve 70 may actually, for mounting purposes, comprise two halves 70a and 70b joined by a threaded section 70c.

Support lugs or spacers 80 are arranged in the spaces between jaws 64a. Bolts 81 passing through lugs 80 integrate collar 67 with socket 63. In one design, the parts 80 may be integrally formed with socket 63 and the internal face 66 of collar 67 may be supported by these lugs. In another design, the parts 80 may be integral with collar 67 and their free extremity passed against the terminal face 65 of socket 63.

Each lug or spacer 80 has two lateral faces 80a and 80b which diverge toward the exterior. Each jaw 64a of the gripping assembly has two lateral faces 64b and 64c which converge toward the exterior, in such a way that the lugs 80 limit the opening of jaws 64a but do not oppose their tightening.

As in other embodiments, the connector is actuated by applying an external force to the worms 73, through its spindle shaft. Rotation of the worm causes rotation of the worm wheel 74. Rotation of the worm wheel 74 causes it to move axially and to force sleeve 70 to axially move therewith. Axial movement of the sleeve 70 forces the gripping jaws 64a into or out of locking engagement with the ball member 62.

It should be noted that the ball-shaped ends of the male members of the described embodiments is a preferred shape which permits two pipes which are not perfectly aligned to be connected. However, this shape is not obligatory and the male member can assume a variation of shapes. For example, it could be a cylindrical surface between two truncated cone surfaces.

Several embodiments and variations of the invention have been described herein. Many more can be made without departing from the spirit of the invention. Therefore, it is intended that the scope of the invention be limited only by the claims which follow.

I claim:

1. Apparatus for joining elongated members in an articulated relationship comprising:
    a male member, attached to one of said elongated members, having a radially enlarged portion thereon;
    a female member, attached to another of said elongated members, into which said male member may be inserted;
    gripping means, carried by said female member, movable from a radially expanded position, in which said male member may be freely inserted and removed from said female member, to a radially contracted position gripping said enlarged portion of said male member preventing removal of said male member and locking it in a fixed articulated relationship with said female member;
    wedge means engageable with cooperating surfaces of said gripping means and movable from a first position, in which said gripping means is in said expanded position, to a second position in which said gripping means is forced into said contracted position; and
    means rotatable by a force applied externally of said apparatus for moving said wedge means between said first and second positions, said rotatable means being self-locking so that upon removal of said externally applied force, said gripping means remains in said contracted, locked position.

2. Apparatus as set forth in claim 1 in which said wedge means comprises a cylindrical member engageable with said rotatable means and axially movable, relative to said female member, for translating rotating movement of said rotatable means to axial movement of said cylindrical member to effect movement of said gripping means to said radially contracted position.

3. Apparatus as set forth in claim 2 in which said rotatable means comprises a first gear member engageable with and driven by a second gear member in response to said externally applied force.

4. Apparatus as set forth in claim 3 in which said first gear member is axially fixed relative to said female member and threadedly connected to said cylindrical member so that said rotation of said first gear member effects said axial movement of said cylindrical member and movement of said gripping means to said contracted position.

5. Apparatus as set forth in claim 4 in which said gripping means comprises a plurality of jaw members attached to said cylindrical member by key means which in cooperation with said wedge means and gripping means cooperating surfaces forces said gripping means into said expanded position upon movement of said wedge means to said first position.

6. Apparatus as set forth in claim 3 in which said first gear member is threadedly connected to a portion of said female member so that upon said rotation of said first gear member it also moves axially, relative to said female member, to effect said axial movement of said cylindrical member and movement of said gripping means to said contracted position.

7. Apparatus as set forth in claim 6 in which gripping means comprises a plurality of jaw members, radially separated by spacing means attached to said female member.

8. Apparatus as set forth in claim 3 in which said first gear member comprises a worm wheel and said second gear member comprises a worm mounted on a shaft to which said externally applied force may be applied.

9. Apparatus as set forth in claim 8 comprising a housing surrounding said first and second gear members and seal means sealingly isolating said gear members within said housing for protection from the environment surrounding said apparatus.

10. Apparatus as set forth in claim 1 in which said wedge means comprises cam surfaces, engageable with cooperating cam surfaces on said gripping means, carried by said rotatable means and rotatable therewith to effect said movement of said gripping means from said expanded position to said contracted position.

11. Apparatus as set forth in claim 10 in which said rotatable means comprises a first gear member engageable with and driven by a second gear member in response to said externally applied force.

12. Apparatus as set forth in claim 11 in which said first gear member comprises a worm wheel and said second gear member comprises a worm mounted on a shaft to which said externally applied force may be applied.

13. Apparatus as set forth in claim 10 in which said gripping means comprises a plurality of jaw members keyed to said female member for non-rotating and non-pivoting but radial movement relative thereto.

14. Apparatus as set forth in claim 2 in which said cylindrical member is free and non-confined on its external surface preventing radial reaction forces of said gripping means from lodging said cylindrical member in said second position.

15. Apparatus as set forth in claim 6 in which said cylindrical member is free and non-confined on its external surface preventing radial reaction forces of said gripping means from lodging said cylindrical member in said second position.

16. Apparatus as set forth in claim 2 in which said gripping means comprises a plurality of jaw members carried between an annular shoulder on said female member and an annular shoulder of a support collar attached to said female member by bolts whose axes are parallel with the axis of said female member.

17. Apparatus as set forth in claim 6 in which said gripping means comprises a plurality of jaw members carried between an annular shoulder on said female member and an annular shoulder of a support collar attached to said female member by bolts whose axes are parallel with the axis of said female member.

18. Apparatus for joining two conduits in an articulated relationship comprising:
a male member, attached to the end of one of said conduits, having a radially enlarged portion with a spherical surface thereon;
a female member, attached to the end of the other of said conduits, and into which said enlarged portion of said male member may be inserted;
gripping means, carried by said female member, movable from a radially expanded position, in which said enlarged male member portion may be freely inserted and removed from said female member, to a radially contracted position gripping said enlarged male member portion, preventing its removal from said female member and locking said male and female members in a first articulated relationship;
a first gear member carried by said female member engageable with and rotatable by a second gear member to which a force may be applied externally of said apparatus; and
wedge means, carried by said female member, engageable with cooperating surfaces on said gripping means and movable, in response to rotation of said first gear member, from a first position, in which said gripping means is in said expanded position, to a second position in which said gripping means is forced into said contracted position.

19. Apparatus as set forth in claim 18 in which said wedge means comprises a cylindrical member engageable with said rotating means and axially movable, relative to said female member, between said first and second positions in response to rotation of said rotatable means.

20. Apparatus as set forth in claim 18 in which said first gear member comprises a worm wheel and said second gear member comprises a worm mounted on a shaft to which said externally applied force may be applied, said worm and worm wheel being inherently self-locking so that upon removal of said externally applied force, said gripping means remains in said gripping contracted position.

21. Apparatus as set forth in claim 19 in which said cylindrical member is free and non-confined on its external surface preventing radial reaction forces of said gripping means from lodging said cylindrical member in said second position.

22. Apparatus as set forth in claim 19 in which said gripping means comprises a plurality of jaw members carried between an annular shoulder on said female member and an annular shoulder of a support collar attached to said female member by bolts whose axes are parallel with the axis of said female member.

* * * * *